(12) United States Patent
Pabion et al.

(10) Patent No.: US 7,137,783 B2
(45) Date of Patent: Nov. 21, 2006

(54) COOLED GAS TURBINE BLADES

(75) Inventors: Philippe Pabion, Vaux le Penil (FR); Jean-Luc Soupizon, Vaux le Penil (FR); Jean-Michel Guimbard, Perthes (FR)

(73) Assignee: Snecma Moteurs, Paris (FR)

( * ) Notice: Subject to any disclaimer, the term of this patent is extended or adjusted under 35 U.S.C. 154(b) by 47 days.

(21) Appl. No.: 10/878,046

(22) Filed: Jun. 29, 2004

(65) Prior Publication Data

US 2004/0265129 A1    Dec. 30, 2004

(30) Foreign Application Priority Data

Jun. 30, 2003    (FR) .................................. 03 07894

(51) Int. Cl.
*F01D 5/18*    (2006.01)

(52) U.S. Cl. .................................... 416/96 A

(58) Field of Classification Search ............. 416/96 A; 415/115, 191, 208.2
See application file for complete search history.

(56) References Cited

U.S. PATENT DOCUMENTS

| | | | |
|---|---|---|---|
| 3,767,322 A * | 10/1973 | Durgin et al. ............ | 416/97 R |
| 4,288,201 A | 9/1981 | Wilson | |
| 4,859,141 A * | 8/1989 | Maisch et al. .............. | 415/115 |
| 6,109,867 A | 8/2000 | Jacques Portefaix | |
| 6,193,465 B1 * | 2/2001 | Liotta et al. .............. | 416/96 A |

FOREIGN PATENT DOCUMENTS

| | | |
|---|---|---|
| EP | 0974733 A2 | 1/2000 |
| EP | 1164250 A2 | 12/2001 |

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

A cooled gas turbine blade includes a foundry part and a longitudinal sleeve obtained by the forming of metal sheet. The foundry part includes a longitudinal body provided with a longitudinal cavity with first and second apertures at its ends. The sleeve is mounted in the cavity being held therein by soldering or brazing to the wall of the first aperture, and an end portion of which is free to slide in the second slide-forming aperture. The end portion and the slide are in sliding contact relatively to surfaces formed by machining. A sealing insert can be positioned between the end portion of the sleeve and the wall of the second aperture. This insert can be integral with the sleeve.

11 Claims, 3 Drawing Sheets

COOLED GAS TURBINE BLADES

The present invention relates to the cooling of blades in a gas turbine engine and in particular of turbine nozzle blades.

High temperature gases coming from the combustion chamber flow through turbine nozzle blades in gas turbine engines. The blades are provided with means for cooling their walls by a flow of air drawn at the compressor for example, so that they may withstand severe operating conditions to which they are subject. Generally, these are forced convection or impact cooling means.

The invention relates to fixed hollow nozzle blades developed by superalloy casting. According to this technique, the metal is cast into a mould around a core which, after its removal, provides a cavity. An insert or sleeve is incorporated into this cavity to organize the flow of the cooling fluid.

A nozzle blade which is presently used in certain aircraft engines, of the type CFM 56 for example, is illustrated in FIG. 1. Here, this is a low pressure nozzle blade 1 with its two platforms, one is an external one 1E, the other an internal one 1I, delimiting the annular channel in which the gas flows. This channel is subdivided by the blades 1, circumferentially. Each blade 1 is equipped with a multi-perforated internal sleeve 3, in its central cavity 1C. In the embodiment of FIG. 1, a central duct inside the very sleeve and a cooling area between the sleeve and the walls of the blade are perceived.

The sleeve is fed with cooling air from a tube 5E placed at the external platform and communicating with a source of cold air, drawn at the compressor, for example. A portion of the admitted air passes through the perforations of the sleeve 3 and is projected against the internal wall of the blades, because of the difference in prevailing pressure between the duct formed by the sleeve and its peripheral area delimited by the sleeve and the internal wall of the blade. This air is then discharged into the gas jet through calibrated perforations, provided at the trailing edge of the blade. The remainder of the unused air in the blade is guided by a connecting tube 1L, which is located under the internal platform 1I, towards other portions of the machine to be cooled, such as the turbine disk or the bearings.

The sleeve is introduced into the blade through the aperture provided at the external platform. It has been made integral with the blade, generally by brazing along the wall of this first aperture of the central cavity, at the external platform. The opposite portion 3I of the sleeve is guided into the second aperture of the blade forming a slide 1G at the internal platform 1I in order to allow relative displacement between the sleeve and the blade. Indeed, the blade is a foundry part and the sleeve is generally obtained by forming of a metal sheet. Because of the difference in materials and in manufacturing methods for both of the parts which make them up as well as between the operating temperatures, there results a change in elongation between the blade and the sleeve. The slide thus provides support of the whole.

Considering the difference between the methods for developing the nozzle and the sleeve, play at the slide is relatively significant. This play notably results from the foundry tolerance, the value of which is significant and from the manufacturing tolerance by the forming of the sleeve. This play generates an air leak at the sleeve exit as the pressure in the impact cooling area is different from that in the central channel at the exit of the sleeve.

If the pressure in the impact cooling area is less than that in the central channel at the exit of the sleeve, the air leak illustrated by arrow F has the first drawback of causing overpressure in the peripheral area. This overpressure is detrimental to the quality of the internal cooling of the blade and more specifically at the area of the trailing edge which is the hottest area. Moreover, this air is not involved in the cooling of the blade as it is carried away directly towards the discharge ports located on the trailing edge. The applicant has set the goal of reducing air leaks in the slide of a cooled blade, in particular a nozzle blade, and more specifically a low pressure nozzle blade.

The present invention achieves this goal with a cooled gas turbine engine blade comprising a foundry part and a longitudinal sleeve obtained by the forming of metal sheet, the foundry part including a longitudinal body provided with a longitudinal cavity with first and second apertures at the ends, the sleeve being mounted in the cavity and fixed by soldering or brazing to the wall of the first aperture, and an end portion of which is free to slide in the second aperture forming a slide. The blade is characterized by the fact that the end portion and the slide are in sliding contact with each other by surfaces formed by machining.

The invention has the advantage of providing, in the case of such of a sliding connection between a sleeve obtained by forming of metal sheet and a foundry part, the benefit of low manufacturing tolerances when the parts are formed by machining.

The invention is applied to fixed nozzle blades and in particular to nozzle blades with a platform at each end of the blade.

The advantages induced in the case of a gas turbine engine nozzle like the one shown in FIG. 1, are significant. A smaller leak means a reduction in the overpressure in the impact cooling area. The cooling of the blades is thereby enhanced and the temperature level of the blades in the area of the trailing edge is lowered. The risk of damaging the blades, by forming cracks under thermal loads is therefore reduced. This results in an increase in the lifetime of the nozzle, in particular of the low pressure nozzle or for equal lifetimes, a reduction in the required ventilation flow rate, therefore an enhancement of the performances or efficiency. In particular, maintenance and repair operations are reduced advantageously.

According to another feature, said end portion of the sleeve is integral with a sealing insert.

Incorporating an insert between the sleeve and the wall of the aperture has the advantage of avoiding machining operations on the end portion of the sleeve. The play may also be adjusted with a greater accuracy.

According to a particular embodiment, the sealing insert includes a component forming a connection to a connecting tube.

The invention is also directed to the method for manufacturing a blade comprising the following steps:

developing the body of the blade in a foundry with a first aperture at one end and a second aperture at the other end, the second aperture comprising a wall with an overthickness forming a machining rework, forming a sleeve with an end portion, machining the overthickness of the wall of the second aperture of the blade's body so that the end portion slides in the slide with a determined play taking the machining tolerances of the second aperture into account, mounting the sleeve in the body of the blade and brazing or soldering of the sleeve to the wall of the first aperture.

According to one feature of the invention, a sealing insert is positioned between the end portion of the sleeve and the second aperture of the body of the blade. In particular, the sleeve is put into place into the body of the blade and the sealing insert is then placed in between the end portion and the second aperture. The wall of the sealing insert coming into contact with the wall of the aperture is itself formed by machining.

According to another feature, the sealing insert is soldered or brazed to the end portion of the sleeve.

Other features and advantages of the present invention will become apparent from the description made hereafter, with reference to the appended drawings which illustrate two non-limiting embodiments of the invention.

Figure 1:
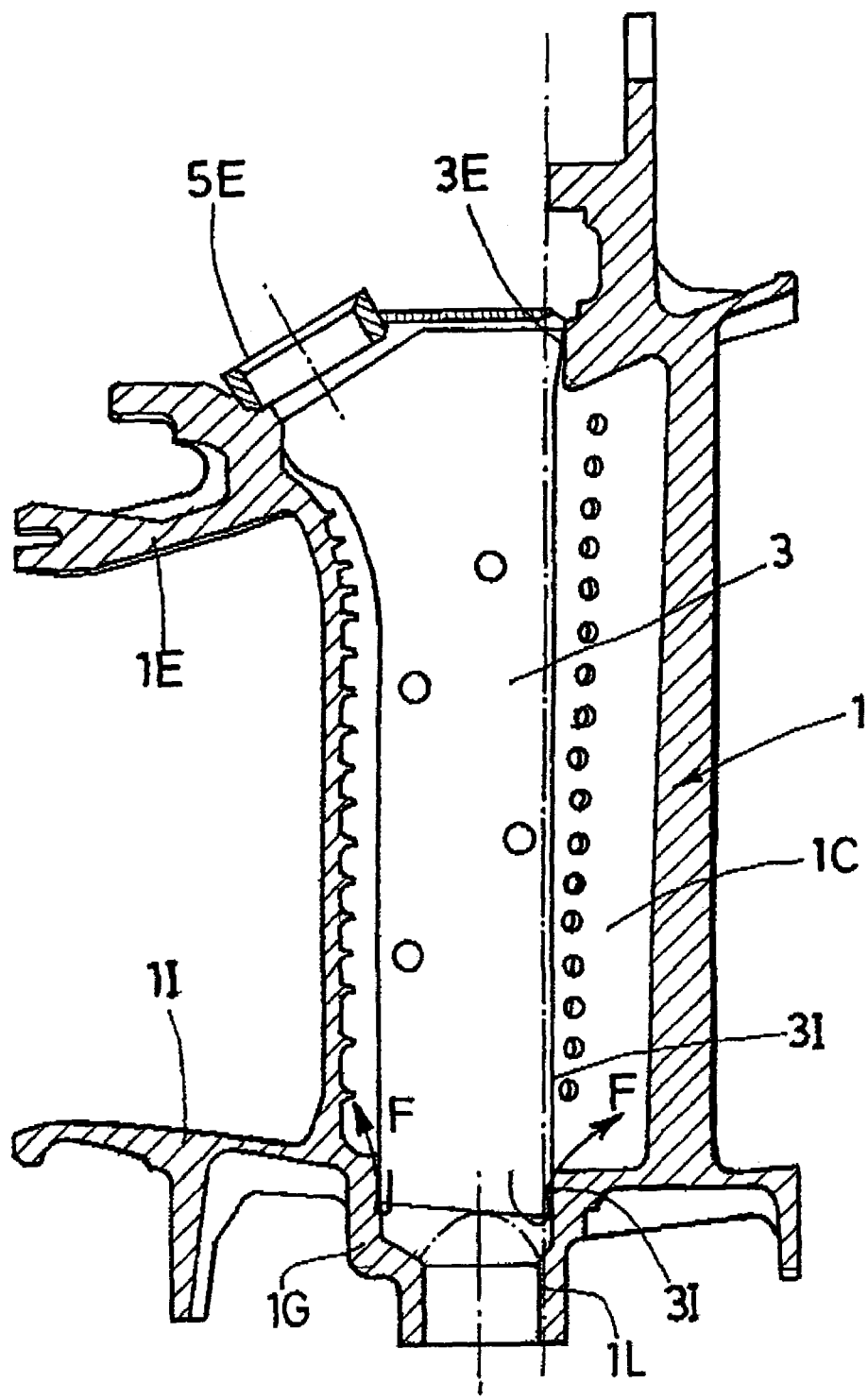
FIG. 1 is a perspective view of a turbine nozzle blade from the prior art.

As seen in FIG. 1, the assembly from the prior art comprises the longitudinal body 1 of the blade, the external 1E and internal 1I platforms, forms a single foundry part. It is observed that the connecting tube 1L into which opens the cavity of the blade, is an integral part of the foundry part and in particular of the inner platform 1I. Therefore the slide 1G is, according to this layout of the blade's components, not accessible through the inner platform. It may only be formed by a foundry process. Sleeve 2 is itself obtained from an appropriately formed metal sheet. The manufacturing tolerances lead to the occurrence of a not insignificant play between the end portion 3I of the sleeve 3 and the slide 1G formed by the second end of the internal cavity of the blade. To find a remedy for this, according to the invention, it is provided that the slide should be produced by machining.

Figure 2:
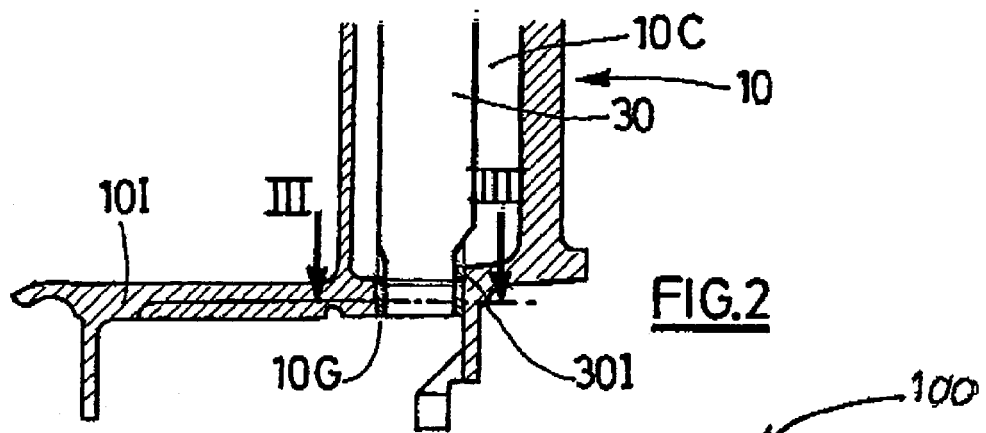
FIG. 2 is a sectional view of a nozzle blade according to the invention.
Figure 3:
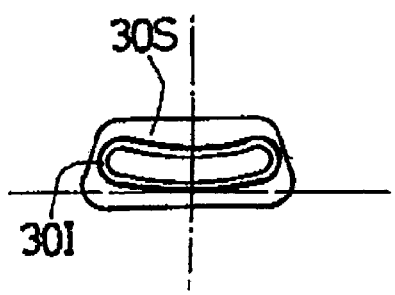
FIG. 3 is a section along the direction III-III of FIG. 2.

The portion of a fixed nozzle blade located near its internal platform is illustrated in FIG. 2. It includes a connecting means between the end portion of the sleeve and the slide according to the invention. Sleeve 30 is inserted inside the central cavity 10C of the blade 10. The end portion 30I of the sleeve is housed in the slide-forming aperture 10G of the blade, provided at the inner platform 10I. According to this preferred embodiment, a sealing insert 30S is positioned between the end portion 30I of the sleeve 30 and the slide 10G. As is seen in FIG. 3, the sealing insert is of a substantially trapezoidal shape. It is conformed so as to fit into the slide 10G with a determined play on its periphery. This play takes the expansion of the parts into account during the different operating phases. The insert is pierced so as to receive the end portion to which it is brazed or soldered. The cooling air flows in the sleeve from the first aperture. A portion of this air passes through the wall of the sleeve through calibrated ports in order to cool by impact the internal wall of the blade. The remainder of this air flow is discharged by the end portion of the sleeve towards other areas to be cooled of the machine. The means for guiding this air have not been illustrated.

The mounting of the sleeve is carried out in the following way. The sleeve is introduced through the first aperture of the blade provided at the external platform, not visible in FIG. 2. The sleeve is pushed into the cavity of the blade until the portion 30I of the sleeve is flush with the inner aperture forming a slide 10G. It is observed that the face of the platform 10I opposite to the gas jet is free to access. The insert is introduced through this side, it is caused to slide around the end portion 30I and it is held in the position shown in FIG. 2. The operation is completed by soldering or brazing the insert onto the sleeve. Advantageously, brazing the sleeve at its other end to the walls of the first aperture at the external platform is performed simultaneously.

In order to be able to assemble the sleeve with this sealing insert in the slide, the parts were manufactured in the following way.

Figure 4:
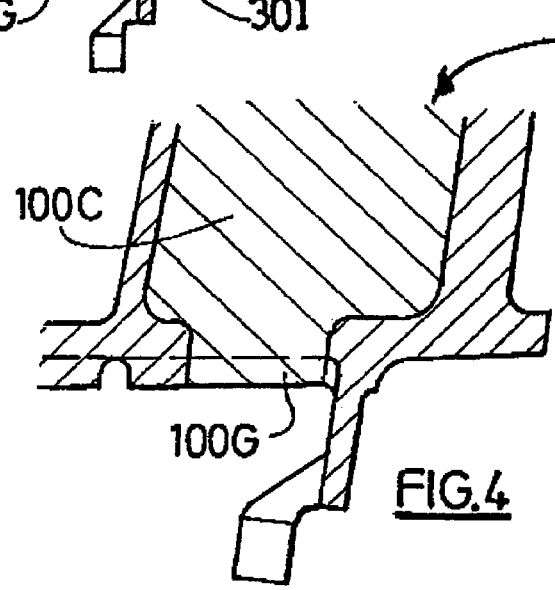
FIGS. 4 and 5 are schematic illustrations of the blade during its manufacturing.
Figure 5:
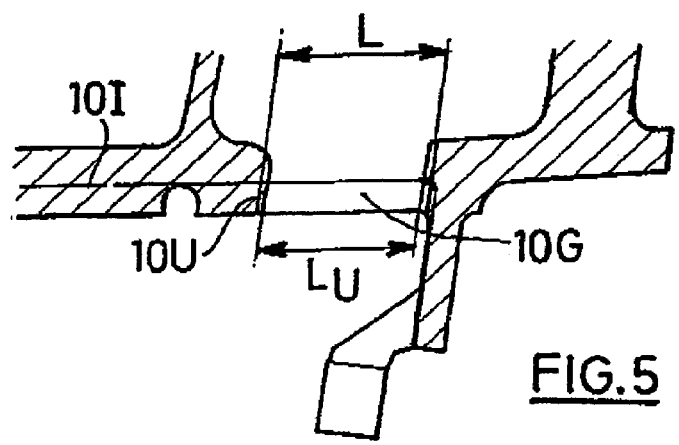

During the foundry step, where the metal is cast into a mould having the recessed shape of the part, a core is used which matches the cavity of the body of the blade. This core 100 is schematically shown in FIG. 4. It has a protruding portion 100G relatively to the body 100C matching to the cavity of the blade. The molten metal is cast around the core and between the other walls of the mould, not shown. The protruding portion 100G was dimensioned so that the part after removal from the mould has a so-called machining overthickness which is then removed by a machining operation. The same portion of the blading leaving the foundry is illustrated in FIG. 5. The core has been eliminated. The aperture 10G upon leaving the foundry therefore has a dimensioning Lu. In the following step, one proceeds with removing by machining an amount of material on the periphery of the aperture, by means of a suitable tool until the required dimensioning L is obtained. The material thickness removed by machining is designated as machining rework. With present machining means, the manufacturing tolerance may be as low as ±0.025 mm. It may be less than the dimensional dispersion upon leaving the foundry or during the forming.

Moreover, the sleeve was manufactured by shaping a metal sheet in a press, and the insert was made with a housing for receiving the end of the sleeve.

By this method for manufacturing the parts, it could be determined that the cooling air leaks were reduced substantially.

Thus, with the machining of the slide-forming aperture, it is possible to obtain a dimensional dispersion reduced to ±0.025 mm instead of ±0.075 mm upon leaving the foundry. As for the insert, since the housing of the sleeve is filled with braze or solder, no leak occurs at this level. Since its side surface is machined, the manufacturing tolerance also is of the order of ±0.025 mm. This tolerance is less than that for the end of the sleeve shaped by forming. The dimensional dispersion in the latter case usually is ±0.1 mm.

In this way, the play in the guiding area and the resulting leaks are better under control. For example, for a blade from the prior art such as illustrated in FIG. 1 with a rated play value X, this in reality is a value X of ±0.175 mm. The leak rate is Y. With the solution of the invention, it was determined that play X could be reduced by 15%, the manufacturing tolerance being ±0.05 mm. There results an 80% reduction in the leak rate Y. From this 80% leak rate reduction, it is estimated that the temperature of the blade's training edge was reduced by 25° C. The lifetime of the latter is therefore increased.

Figure 6:
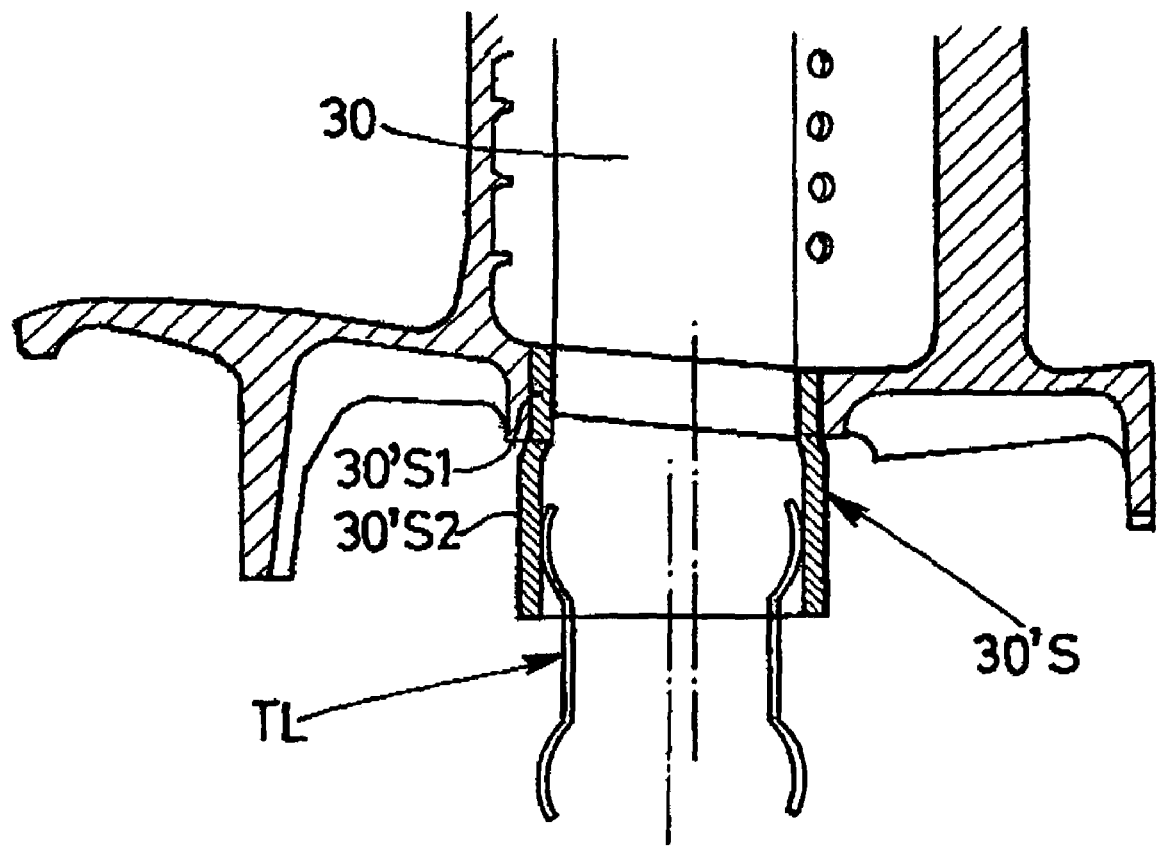
FIG. 6 illustrates another embodiment of the invention.

A second embodiment of the sealing insert is illustrated in FIG. 6. The insert 30'S consists of a first portion 30'S1 forming a sealing component between the end portion 30I of the sleeve and the slide-forming aperture 10G of the blade. It comprises a second portion 30'S2 extending the former. This portion has the function of connecting the channel of the sleeve to a connecting tube TL for guiding the cooling air towards the other portions of the engine which are in the inner space delimited by the internal platforms. This component in particular is of circular section.

This solution is of a particular interest if it is desired to convert the fixed blades from the prior art of the type illustrated in FIG. 1, and to equip them with the solution of the invention. For the conversion and after having separated the sleeve from the foundry part, one starts with removing, by machining, the portion of the internal platform of the fixed blading which includes the connecting tube. When the connecting tube has been removed, the internal platform is machined at the slide. The aperture is shaped so as to obtain a calibrated housing for the insert which has been prepared elsewhere.

The thereby prepared foundry part may be reassembled with the sleeve which is slid into the cavity of the blade from the first aperture at the external platform, which has been cleared. When the sleeve is in place in the housing of the slide, the insert is introduced onto the end portion through the second aperture and one proceeds with brazing or soldering, according to the desired technique, of the insert on the end portion.

The previous description of both embodiments does not limit the invention to the placing of a sealing insert between the end portion and the slide-forming aperture. The invention also covers an embodiment wherein the end portion is conformed so as to be able to be machined and to be in sliding contact with the machined wall of the slide.

The invention claimed is:

1. A cooled gas turbine engine blade comprising a foundry part and a longitudinal sleeve obtained by the forming of metal sheet, the foundry part including a longitudinal body provided with a longitudinal cavity with first and second apertures at its ends, the sleeve being mounted in the cavity being held therein by soldering or brazing to the wall of the first aperture, and an end portion of the sleeve is free to slide in the second aperture forming a slide, wherein the end portion of the sleeve and the slide are in a sliding contact relatively to each other along surfaces, said surfaces being formed by machining.

2. The blade according to claim 1, forming a fixed nozzle blade.

3. The blade according to claim 2, forming a fixed nozzle blade with a platform at each end of the body of the blade.

4. The blade according to claim 1, wherein said surfaces have a manufacturing tolerance of +/−0.025 mm.

5. The blade according to claim 1, wherein said surfaces have a manufacturing tolerance of +/−0.05 mm.

6. A cooled gas turbine engine blade comprising a foundry part and a longitudinal sleeve obtained by the forming of metal sheet, the foundry part including a longitudinal body provided with a longitudinal cavity with first and second apertures at its ends, the sleeve being mounted in the cavity being held therein by soldering or brazing to the wall of the first aperture, and an end portion of the sleeve is free to slide in the second aperture forming a slide, wherein the end portion of the sleeve is integral with a sealing insert interposed between the end portion and the wall of the slide-forming aperture and in a sliding contact with said wall along surfaces formed by machining.

7. The blade according to claim 6, the sealing insert of which includes a portion forming a connection to a connecting tube.

8. A method for manufacturing a cooled gas turbine engine blade comprising a foundry part and a longitudinal sleeve obtained by the forming of metal sheet, the foundry part including a longitudinal body provided with a longitudinal cavity with first and second apertures at its ends, the sleeve being mounted in the cavity being held therein by soldering or brazing to the wall of the first aperture, and an end portion of the sleeve is free to slide in the second aperture forming a slide, wherein the end portion of the sleeve and the slide are in a sliding contact relatively to each other along surfaces, comprising the following steps:

developing the body of the blade in a foundry with a first aperture at one end and a second aperture at the opposite end, the second aperture comprising a wall with an overthickness forming a machining rework, forming a sleeve with an end portion, machining the overthickness of the wall of the second aperture of the body of the blade in such a way that the end portion slides in the slide with a determined play taking machining tolerance into account, mounting the sleeve in the body of the blade and brazing or soldering the sleeve to the wall of the first aperture.

9. The method according to claim 8, wherein a sealing insert is positioned between the end portion of the sleeve and the wall of the second aperture of the body of the blade.

10. The method according to claim 9, wherein the sleeve is put into place in the body of the blade and the sealing insert is then put into place between the end portion and the wall of the second aperture.

11. The method according to claim 10, wherein the sealing insert is soldered or brazed to the end portion of the sleeve.

* * * * *